United States Patent
Shi et al.

(10) Patent No.: US 12,234,391 B2
(45) Date of Patent: Feb. 25, 2025

(54) TWO-PART ADHESIVE COMPOSITION

(71) Applicant: Henkel AG & Co. KGaA, Düsseldorf (DE)

(72) Inventors: ZhuMing Shi, Shanghai (CN); Cheng Lu, Shanghai (CN)

(73) Assignee: Henkel AG & Co. KGaA, Duesseldorf (DE)

( * ) Notice: Subject to any disclaimer, the term of this patent is extended or adjusted under 35 U.S.C. 154(b) by 571 days.

(21) Appl. No.: 17/203,028

(22) Filed: Mar. 16, 2021

(65) Prior Publication Data

US 2021/0198525 A1 Jul. 1, 2021

Related U.S. Application Data

(63) Continuation of application No. PCT/CN2018/105920, filed on Sep. 17, 2018.

(51) Int. Cl.
| | |
|---|---|
| *C09J 4/06* | (2006.01) |
| *C08F 287/00* | (2006.01) |
| *C08K 5/14* | (2006.01) |
| *C08L 33/12* | (2006.01) |
| *C08L 53/02* | (2006.01) |
| *C09J 153/02* | (2006.01) |
| *C09J 163/00* | (2006.01) |

(52) U.S. Cl.
CPC ............... *C09J 4/06* (2013.01); *C08F 287/00* (2013.01); *C08K 5/14* (2013.01); *C09J 153/02* (2013.01); *C09J 163/00* (2013.01); *C08L 33/12* (2013.01); *C08L 53/025* (2013.01)

(58) Field of Classification Search
CPC .... C09J 153/02; C09J 153/025; C09J 125/04; C09J 125/08; C09J 125/10; C09J 133/10; C09K 5/14
See application file for complete search history.

(56) References Cited

U.S. PATENT DOCUMENTS

| | | | |
|---|---|---|---|
| 4,182,644 A * | 1/1980 | Briggs, Jr | C09J 4/06 156/332 |
| 4,452,955 A | 6/1984 | Boeder | |
| 4,945,006 A | 7/1990 | Muggee et al. | |
| 5,328,947 A | 7/1994 | Taguchi et al. | |
| 6,383,655 B1 | 5/2002 | Moren | |
| 2001/0051701 A1 | 12/2001 | Quarmby | |
| 2003/0144416 A1 * | 7/2003 | Tarbutton | C08G 59/182 525/65 |
| 2007/0155899 A1 * | 7/2007 | Briggs | C08L 53/02 525/88 |
| 2014/0231009 A1 * | 8/2014 | Chitnavis | C09J 4/06 156/332 |

FOREIGN PATENT DOCUMENTS

| | | | |
|---|---|---|---|
| CN | 105778783 A * | 7/2016 | |
| WO | WO-2009009009 A2 * | 1/2009 | ............ C08F 220/14 |

* cited by examiner

*Primary Examiner* — Marc S Zimmer
*Assistant Examiner* — Jeffrey S Lenihan
(74) *Attorney, Agent, or Firm* — Steven C. Bauman

(57) ABSTRACT

This invention relates to a two-part adhesive composition, comprising a first part comprising at least one ethylenically unsaturated monomer, at least one non-polar styrenic block copolymer, and at least one curing promoter; and a second part comprising at least one initiator. The two-part adhesive composition exhibits excellent adhering strength to both metal substrate and plastic substrate.

18 Claims, No Drawings

TWO-PART ADHESIVE COMPOSITION

TECHNICAL FIELD

This invention relates to a two-part adhesive composition, comprising a first part comprising at least one ethylenically unsaturated monomer, at least one non-polar styrenic block copolymer, and at least one curing promoter; and a second part comprising at least one initiator. The two-part adhesive composition exhibits excellent adhering strength to both metal substrate and plastic substrate.

BACKGROUND OF THE INVENTION

In many occasions, substrates of the same material or different materials may need to be attached together. However, different materials have different surface energy, it is hard to have an adhesive that can be applied to bond high surface energy substrates, such as copper, aluminum and stainless steel, and at the same time to bond low surface energy substrates, such as polyvinyl chloride (PVC), polycarbonate (PC), and polyethylene (PE).

Bonding high surface energy substrates is relatively less challenging. In general, adhesives have lower surface energy than the substrates, and therefore are readily flow on to the surface of the substrates to maximize the contact area and the attractive forces between the adhesive and the surface.

Low surface energy substrates, on the other hand, are particularly troublesome to be bonded by adhesives because adhesives tend to bead up rather than wet out, reducing the contact area with the surface. Traditionally, low surface energy substrates need to be mechanically attached or solvent welded because adhesive bonding did not work well with these materials. However, mechanical attachments, such as clips and screws, can cause stress concentrations which may result in cracking and premature failures of the low surface tension substrates. Solvent welding has the problem of relying on the use of hazardous and noxious solvents which is undesirable for the health of workers.

Surface modification is an alternative way to bond low surface energy substrates. Techniques, such as flame, plasma treatment, and acid etching, are able to change the chemical composition of the surface to increase the surface energy, so that it will be easier for adhesives to wet the treated surface and make a suitable bond. However, the additional surface modification step is costly and adds the complexity of the application of low surface tension substrates.

Another way to enhance the adhesion strength of adhesives to low surface energy substrates is to incorporate methyl methacrylate (MMA) in the adhesive system. The drawback of incorporating MMA is that the MMA based adhesive has unpleasant odor and can cause allergy.

Therefore, there is a need for developing an adhesive composition, which can be applied to bond both high surface energy substrates and low surface energy substrates. More desirably, the adhesive composition has low odor and exhibits good reliability under harsh conditions such as high temperature and high humidity.

SUMMARY OF THE INVENTION

The present invention relates to a two-part adhesive composition, comprising:
 (a) a first part comprising:
  (i) at least one ethylenically unsaturated monomer;
  (ii) at least one non-polar styrenic block copolymer; and
  (iii) at least one curing promoter:
 (b) a second part comprising at least one initiator.

The two-part adhesive composition of the invention exhibits high adhesion strength to both high energy surface substrates and low surface energy substrates.

The present invention also relates to a cured product of the two-part adhesive composition.

The present invention also relates to an article bonded by the two-part adhesive composition.

DETAILED DESCRIPTION OF THE INVENTION

In the following passages the present invention is described in more detail. Each aspect so described may be combined with any other aspect or aspects unless clearly indicated to the contrary. In particular, any feature indicated as being preferred or advantageous may be combined with any other feature or features indicated as being preferred or advantageous.

In the context of the present invention, the terms used are to be construed in accordance with the following definitions, unless a context dictates otherwise.

As used herein, the singular forms "a", "an" and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or process steps.

The recitation of numerical end points includes all numbers and fractions subsumed within the respective ranges, as well as the recited end points.

All references cited in the present specification are hereby incorporated by reference in their entirety.

Unless otherwise defined, all terms used in the disclosing the invention, including technical and scientific terms, have the meaning as commonly understood by one of the ordinary skill in the art to which this invention belongs to. By means of further guidance, term definitions are included to better appreciate the teaching of the present invention.

In the context of this disclosure, a number of terms shall be utilized.

The term "acrylate" refers to both or any one of "acrylate" and "methacrylate".

The term "acrylic" refers to both or any one of "acrylic" and "methacrylic".

The term "optionally substituted univalent hydrocarbon group" refers to an optionally substituted alkyl group, such as methyl, ethyl, propyl, butyl, pentyl, hexyl, isopropyl, tertiary butyl, isobutyl, chloromethyl, 3,3,3-trifluoropropyl and the groups alike: an optionally substituted alkenyl group, such as vinyl, allyl, butenyl, pentenyl, hexenyl and the groups alike: an optionally substituted aralkyl group, such as benzyl, phenethyl, 2-(2,4,6-trimethylphenyl) propyl and the groups alike; or an optionally substituted aryl group, such as phenyl, tolyl, xyxyl and the groups alike.

The term "non-polar" refers to a compound which does not include a polar functional group (e.g. —Cl, —Br, —OH, —CN, —COOH, —COOCH$_3$).

The term "ethylenically unsaturated" refers to at least a site of unsaturation, which is not aromatic.

The term "polyacrylate polymer" refers to polymers resulting from polymerization of two or more acrylate monomers. Copolymers of acrylate monomers with other monomers containing vinyl groups are also included within the term of "polyacrylate polymer".

The First Part
<Ethylenically Unsaturated Monomer>

The first part of the present invention comprises at least one ethylenically unsaturated monomer capable of free radical polymerization. The ethylenically unsaturated monomer preferably contains at least one group having the following general formula:

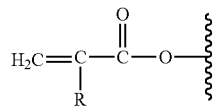

In the formula, R represent hydrogen, halogen, or an optionally substituted $C_1$ to $C_{20}$ univalent hydrocarbon group. Preferably, R is hydrogen or an optionally substituted $C_1$ to $C_{10}$ univalent hydrocarbon group.

Exemplary of the ethylenically unsaturated monomer includes but not limited to isobornyl acrylate (IBOA), isobornyl methacrylate (IBOMA), cyclohexyl acrylate, cyclohexyl methacrylate, t-butyl acrylate, t-butyl methacrylate, t-butylcyclohexyl acrylate, methyl methacrylate, ethyl methacrylate, propyl methacrylate, phenyl acrylate, phenyl methacrylate, benzyl acrylate, benzyl methacrylate, phenethyl acrylate, phenethyl methacrylate, dicyclopentanyl acrylate, 3,3,5-trimethylcyclohexyl acrylate, 3,3,5-trimethylcyclohexyl methacrylate, dicyclopentenyl acrylate, 1,6-hexanediol diacrylate, 2-ethylhexyl acrylate, n-octyl acrylate, n-nonyl acrylate, n-decyl acrylate, isooctyl acrylate, n-lauryl acrylate, n-tridecyl acrylate, n-cetyl acrylate, n-stearyl acrylate, isomyristyl acrylate, and isostearyl acrylate. The ethylenically unsaturated monomer can be used alone or in any combination.

Examples of commercially available ethylenically unsaturated monomers are, for example, IBOMA, THFMA (tetrahydrofurfuryl methacrylate), PhEMA (phenoxyethyl methacrylate), IBOA, EHMA (ethylene glycol dimethacrylate) from KPX; TEGDMA (triethylene glycol dimethacrylate) from Satomer; and DHMA (ethylene glycol dimethacrylate) from BASF.

In some embodiments of the present invention, the amount of the ethylenically unsaturated monomer in the first part is from 20 to 90%, preferably from 30 to 80%, and more preferably from 55 to 70% by weight based on the total weight of the first part.

In further embodiments of the present invention, the two-part adhesive composition preferably contains from 0 to 5%, more preferably from 0 to 0.5%, even more preferably from 0 to 0.05%, and most preferably 0% of methyl methacrylate (MMA) by weight of the first part in order to reduce the irritating odor of the two-part adhesive composition. It is surprisingly found that even when there is essentially no MMA incorporated, the bonding strength of the two-part adhesive composition is still high to both high surface energy substrates and low surface energy substrates.

<Non-Polar Styrenic Block Copolymer>

The first part of the present invention comprises at least one non-polar styrenic block copolymer. The non-polar styrenic block copolymer may be prepared by the copolymerization of an aromatic hydrocarbon compound having a vinyl group with an olefin having at least two ethylenic unsaturations. Preferably, the non-polar styrenic block copolymer is prepared by the copolymerization of a styrene with a conjugated diene compound, such as 1,3-butadiene, 2-methyl-1,3-butadiene (or isoprene), 2,3-dimethyl-1,3-butadiene, 1,3-pentadiene, 1,3-hexadiene and the like. Exemplary of the non-polar styrenic block copolymer includes but not limited to a styrene-butadiene (SBS) block copolymer, a styrene-isoprene (SIS) block copolymer or a partially hydrogenated product of SBS or SIS with at least one ethylenic unsaturation. The non-polar styrenic block copolymer can be used alone or in any combination. It is surprisingly found that the non-polar styrenic block copolymer is able to enhance the adhesion strength of the two-part adhesive composition to both high surface energy substrates and low surface energy substrates, and if the amount of non-polar styrenic block copolymer is equal to or less than 15% by weight of the first part, the adhesion strength of the two-part adhesive composition to low surface energy substrate under rigorous condition is poor.

Examples of commercially available non-polar styrenic block copolymers are, for example, BR 78, BR113, BR116 from Elvacite; and SBS 0243, SBS 1155, SBS 1116 from Kraton.

In some embodiments of the present invention, the amount of the non-polar styrenic block copolymer in the first part is from 10 to 45%, and preferably from 20 to 30% by weight based on the total weight of the first part.

<Curing Promoter>

The first part of the present invention comprises at least one curing promoter. The curing promoter may be selected from amines, such as methyldiethanolamine, triethanolamine, diethylaminopropylamine, benzyldimethyl amine, N,N-dimethyl-p-toluidine (DMPT), dihydroxyethyl-p-toluidine (HEPT) and the like: imidazoles, such as 1-methylimidazole, 2-methylimidazole, 2,4-diethylimidazole and the like; polyamines, such as trimethylhexamethylenediamine, 2-methylpentanediamine, and the like; phosphorus compounds, such as triphenyl phosphine (TPP), tri (2,6-dimethoxyphenyl)phosphine, tri (para-tolyl)-phosphine, triphenyl phosphite and the like; and organometallic compounds, such as copper octanoate, copper 2-ethylhexanoate, copper acetylacetonate, cobalt naphthenate, cobalt octanoate, cobalt 2-ethylhexanoate, cobalt acetylacetonate, cobalt isooctanoate, nickel octanoate, nickel 2-ethylhexanoate, nickel acetylacetonate, and the like. The curing promoters can be used alone or in any combination.

Examples of commercially available curing promoters are, for example, TPP, DMPT, HEPT, and cobalt isooctanoate from Sinopharm.

In some embodiments of the present invention, the amount of the curing promoter in the first part is from 0.1 to 10%, preferably from 1 to 5%, and more preferably from 1 to 3% by weight based on the total weight of the first part.

<Ethylenically Unsaturated Carboxylic Acid>

The first part of the present invention may optionally further comprise at least one ethylenically unsaturated carboxylic acid. Preferably, the ethylenically unsaturated carboxylic acid is in the form of (meth)acrylate-termination. Exemplary of the ethylenically unsaturated carboxylic acid includes but not limited to acrylic acid, male acid, itaconic acid, crotonoic acid, fumaric acid. The ethylenically unsaturated carboxylic acid of the present invention can be used alone or in any combination. It is surprisingly found that in the presence of a suitable amount of ethylenically unsaturated carboxylic acid, the adhesion performance of the two-part adhesive composition to low surface energy substrates under rigorous condition and the adhesion performance of the two-part adhesive composition to high surface energy substrates under normal condition (23° C., 50% RH) could be improved. It is further found that if too much ethylenically unsaturated carboxylic acid is incorporated, for example the amount of ethylenically unsaturated carboxylic acid is greater than 2.5% by weight of the total weight of the first part, the adhesion performance of the two-part adhesive composition under rigorous condition is deteriorated.

Example of commercially available ethylenically unsaturated carboxylic acid is, for example, methacrylic acid (MAA) from Sinopharm.

In some embodiments of the present invention, the amount of the ethylenically unsaturated carboxylic acid in the first part is from 0 to 10%, preferably from 0.5 to 2.5%, and more preferably from 1 to 1.5% by weight based on the total weight of the first part.

<Polyacrylate Polymer>

The first part of the present invention may optionally further comprise at least one polyacrylate polymer. The polyacrylate polymer includes both salts and esters of polyacrylic acid. Exemplary of the polyacrylate polymer includes but not limited to poly(methyl methacrylate), poly(ethyl methacrylate) and sodium polyacrylate. It is surprisingly found that polyacrylate polymer functions to improve the bonding performance of the two-part adhesive composition to low surface energy substrates under rigorous conditions, but has negative impact on the bonding strength of the two-part adhesive composition to low surface energy substrates under normal condition (23° C., 50% RH).

Examples of commercially available polyacrylate polymer are, for example, Elvacite acrylic resin 2021 (poly(methyl methacrylate)) and 2595 (modified poly(methyl methacrylate) from Lucite International.

In some embodiments of the present invention, the amount of the polyacrylate polymer in the first part is from 0 to 10%, and preferably from 4 to 9% by weight based on the total weight of the first part.

<Toughener>

The first part of the present invention may optionally further comprise at least one toughener. The toughener may be selected from vinyl-terminated polybutadiene and core-shell rubber. The toughener can be used alone or in any combination.

The vinyl-terminated polybutadienes preferably have a glass transition temperature below 0° C. The vinyl-termination may be in the form of (meth)acrylate-termination. Exemplary of the vinyl-terminated polybutadiene includes but not limited to (meth)acrylate-terminated polybutadiene-acrylonitrile copolymers and (meth)acrylate-terminated polybutadiene.

Examples of commercially available vinyl-terminated polybutadienes are, for example, Hypro VTBN from Emerald Performance Polymers; and VTB from Cray Valley.

The core shell rubber of the present invention refers to any common core shell rubber known in the art. Typically, the core shell rubber has a core comprised of a polymeric material having rubbery properties, and a shell grafted onto the core or crosslinked to the core. The core of the core shell rubber may be selected from an acrylic rubber, a silicone rubber and a diene rubber. The shell of the core shell rubber may be selected from an acrylic polymer, an acrylic copolymer, a styrenic polymer, and a styrenic copolymer. Exemplary of the core shell rubber includes but not limited to acrylonitrile-butadiene-styrene (ABS), methacrylate-butadiene-styrene (MBS), and methacrylate-acrylonitrile-butadiene-styrene (MABS).

Examples of commercially available core shell rubbers are, for example, MBS-TX100 from Arkema; and ABS 338 from GE.

In some embodiments of the present invention, the amount of the toughener in the first part is from 0 to 40%, preferably from 5 to 30%, and more preferably from 5 to 10% by weight based on the total weight of the first part.

<Coupling Agent>

The first part of the present invention may optionally further comprise at least one coupling agent. The coupling agent of the present invention may be any common coupling agent known in the art. The coupling agent may be selected from a silane coupling agent, a titanate coupling agent, or the like. The coupling agent of the present invention can be used alone or in combination. The silane coupling agent can be exemplified by epoxy-containing alkoxysilane, such as 3-glycidoxypropyl trimethoxysilane, 3-glycidoxypropyl methyldiethoxysilane, and 3-glycidoxypropyl triethoxysilane: amino-containing alkoxysilane, such as gamma-aminopropyl trimethoxysilane, gamma-aminopropyl triethoxysilane, gamma-aminopropyl triisopropoxysilane, and gamma-aminopropylmethyl dimethoxysilane; and mercapto-containing alkoxysilane, such as 3-mercaptopropyl trimethoxysilane. The titanate coupling agent can be exemplified by i-propoxytitanium tri(i-isostearate). The coupling agents can be used alone or in any combination.

Examples of commercially available coupling agents are, for example, KMB403, KMB 603 from Shin-Etsu Chemical: SILQUEST A187, SILQUEST A1120 from Momentive; KH570 from Dowcorning; and GENIOSIL GF9 from Wacker Chemie AG.

In some embodiments of the present invention, the amount of the coupling agent in the first part is from 0 to 10%, preferably from 1 to 5%, and more preferably from 1 to 2.5% by weight based on the total weight of the first part.

<Inhibitor>

The first part of the present invention may optionally further comprise at least one inhibitor. The inhibitor of the present invention may be any common acid polymerization inhibitor and free radical inhibitor known in the art. Exemplary of the inhibitor includes but not limited to sulfur dioxide, glacial acetic acid, hydroquinone, 2-methylhydroquinone, 2-t-butylhydroquinone, t-butyl catechol, butylated hydroxy toluene, 4-methoxyphenol, 2,6-di-tertbutylphenol, and the like. The inhibitors can be used alone or in any combination.

Example of commercially available inhibitor is, for example, BHT from Sinopharm.

In some embodiments of the present invention, the amount of the inhibitor in the first part is from 0 to 5%, preferably from 0.05 to 3%, and more preferably from 0.1 to 0.2% by weight based on the total weight of the first part.

<Wax>

The first part of the present invention may optionally further comprise at least one wax. The wax of the present invention may be any common wax known in the art. Exemplary of the wax includes but not limited to paraffin waxes, microcrystalline waxes, polyethylene waxes, polypropylene waxes, Fischer-Tropsch waxes, oxidized Fischer-Tropsch waxes and functionalized waxes and fatty amide waxes. The waxes can be used alone or in any combination.

Examples of commercially available waxes are, for example, Sasaolwax H1 from Sasol Wax: AC-400 from Honeywell: MC-400 from Marcus Oil Company: Epolene C-18 from Eastman Chemical: Wax 58 # from Sinopharm; and AC-575P from Honeywell.

In some embodiments of the present invention, the amount of the wax in the first part is from 0 to 5%, preferably from 0.05 to 1%, and more preferably from 0.1 to 0.5% by weight based on the total weight of the first part.

The Second Part
<Initiator>

The second part of the present invention comprises at least one initiator. The initiator of the present invention may be selected from a peroxide initiator, such as acetyl peroxide, dicumyl peroxide (DCP), 2,5-dimethyl-2,5-bis(t-butylperoxy)-hexyne (DBPH), benzoyl peroxide (BPO), bis(2,4-dichlorobenzoyl)peroxide (DCBP), tert-butyl peroxypivalate (BPP), dicyclohexyl peroxydicarbonate (DCPD), potassium persulfate (KSP), ammonium persulfate (ASP), and the like: an azo-compound initiator, such as 2,2'-azo-bis(4-methoxy-2,4-dimethylvaleronitrile), 2,2'-azo-bis-isobutyronitrile, azobisisoheptonitrile, and the like; and a persulfate initiator, such as potassium persulfate, sodium persulfate, ammonium persulfate, and the like. The initiators can be used alone or in any combination. Preferably, a peroxide initiator is used.

Examples of commercially available epoxy curing agent, for example, are BPO from Sinopharm; and VAZO 52, VAZO 67 from DuPont Chemical.

In some embodiments of the present invention, the amount of the initiator is preferably from 5 to 70%, and more preferably from 10 to 35% by weight based on the total weight of the second part.

<Epoxy Resin>

The second part of the present invention may optionally further comprise at least one epoxy resin. The epoxy resin of the present invention refers to any common epoxy resin known in the art and contains at least one epoxy group per molecule. Exemplary of the epoxy resin includes but not limited to bisphenol A epoxy resins, bisphenol F epoxy resins, biphenyl epoxy resins, naphthalene epoxy resins, diphenyl ether epoxy resins, diphenyl thioether epoxy resins, hydroquinone epoxy resins, biphenyl novolac epoxy resins, cresol novolac epoxy resins, phenol novolac epoxy resins, bisphenol A novolac epoxy resins, trisphenol epoxy resins, tetraphenylolethane epoxy resins, and the like. The epoxy resin can be used alone or in any combination.

Examples of commercially available epoxy resin are, for example, D.E.R. 331 from Olin Corporation: Epoxy 828 from Hexion Specialty Chemicals GmbH; and EPICLON N-665 from Dainippon Ink and Chemicals Inc.

In some embodiments of the present invention, the amount of the epoxy resin is from 0 to 50%, preferably from 10 to 50%, and more preferably from 15 to 30% by weight based on the total weight of the second part.

<Plasticizer>

The second part of the present invention may optionally further comprise at least one plasticizer. The plasticizer of the present invention refers to any common plasticizer known in the art. Exemplary of the plasticizer includes but not limited to phosphate esters, aliphatic esters, aromatic esters, dioctyl terephthalate (DOTP), dioctyl phthalate (DOP), di(isononyl) phthalate (DINP), di(isodecyl) phthalate (DIDP), diundecyl phthalate (DUP), dioctyl Adipate (DOA), diisononyl adipate (DINA), trioctyl trimellitate (TOTM), trioctyl phosphate (TOP), tricresyl phosphate (TCP) and the like. The plasticizers can be used alone or in any combination.

Examples of commercially available plasticizer are, for example, DOTP from Sinopharm; and DOA from Wengiang Chemical.

In some embodiments of the present invention, the amount of the plasticizer in the second part is from 0 to 40%, and preferably from 15 to 30% by weight based on the total weight of the second part.

<Hydrogenated Styrenic Block Copolymer>

The second part of the present invention may optionally further comprise at least one hydrogenated styrenic block copolymer. The hydrogenated styrenic block copolymer of the present invention may be prepared by hydrogenation of a styrenic block copolymer. Exemplary of the hydrogenated styrenic block copolymer includes but not limited to a styrene-ethylene-butylene-styrene (SEBS) block copolymer, a styrene-ethylene-propylene-styrene (SEPS) block copolymer, or a styrene-ethylene-ethylene/propylene-styrene (SEEPS) block copolymer. The hydrogenated styrenic block copolymers can be used alone or in any combination.

Commercially available hydrogenated styrenic block copolymer is, for example, MD 1652 from Kraton.

In some embodiments of the present invention, the amount of the hydrogenated styrenic block copolymer in the second part is from 0 to 40%, and preferably from 10 to 30% by weight based on the total weight of the second part.

The second part of the present invention may optionally further comprise at least one filler and/or at least one colorant. The filler and colorant can be any common filler and colorant known in the art.

In a preferred embodiment, the two-part adhesive composition comprises:
(a) a first part comprising:
(i) from 20 to 90% by weight of the first part of at least one ethylenically unsaturated monomer;
(ii) from 10 to 45% by weight of the first part of at least one non-polar styrenic block copolymer;
(iii) from 0.1 to 10% by weight of the first part of at least one curing promoter;
(iv) from 0 to 10% by weight of the first part of at least one ethylenically unsaturated carboxylic acid;
(v) from 0 to 10% by weight of the first part of at least one polyacrylate polymer;
(vi) from 0 to 40% by weight of the first part of at least one toughener;
(vii) from 0 to 10% by weight of the first part of at least one coupling agent;
(viii) from 0 to 5% by weight of the first part of at least one inhibitor; and
(ix) from 0 to 5% by weight of the first part of at least one wax;
wherein the weight percentages of all components in the first part add up to 100%:
(b) a second part comprising:
(i) from 5 to 70% by weight of the second part of at least one initiator;
(ii) from 0 to 50% by weight of the second part of at least one epoxy resin;
(iii) from 0 to 40% by weight of the second part of at least one plasticizer;
(iv) from 0 to 40% by weight of the second part of at least one hydrogenated styrenic block copolymer; and
(v) from 0 to 1% by weight of the second part of at least one colorant;
wherein the weight percentages of all components in the second part add up to 100%.

The first part should be used in a weight ratio to the second part, in the range of 20:1 to 1:1, such as 10:1 and 5:1. A person skilled in the art will be able to make appropriate choices among the varies components based on the description, representative examples and guidelines of the present invention to prepare a composition to achieve desired effects.

The two-part adhesive composition of the present invention may be prepared by
(a) preparing a first part:
(i) mixing ethylenically unsaturated monomer, non-polar styrenic block copolymer, and curing promoter in a temperature range from 10 to 50° C.; and
(ii) cooling the mixture from step (i) to room temperature:
(b) preparing a second part:
(i) obtaining initiator:
(c) mixing the first part and the second part at a desired ratio.

The two-part adhesive composition of the present invention may be also prepared by
(a) preparing a first part:
(i) mixing ethylenically unsaturated monomer, non-polar styrenic block copolymer and curing promoter in a temperature range from 10 to 50° C.;
(ii) optionally adding ethylenically unsaturated carboxylic acid, and/or polyacrylate polymer, and/or toughener, and/or coupling agent, and/or inhibitor, and/or wax to the mixture obtained from step (i); and
(iii) cooling the mixture from step (i) or (ii) to room temperature:
(b) preparing a second part:
(i) mixing hydrogenated styrenic block copolymer, and/or plasticizer, and/or epoxy resin in a temperature range from 20 to 120° C.;
(ii) cooling the mixture from step (i) to room temperature; and
(iii) adding initiator, and optionally adding colorant to the cooled mixture from step (ii):
(c) mixing the first part and the second part at a desired ratio.

The first part and the second part should be combined from 0 to 3 minutes prior to the use of the two-part adhesive composition for substrate bonding.

The two-part adhesive composition of the present invention may be cured in a temperature range from −10 to 40° C. and applied to substrates by a mixing gun.

The adhesion strength of the two-part adhesive composition of the present invention to high surface energy substrate may be assessed according to ASTM1002.

The two-part adhesive composition of the present invention preferably has an adhesion strength ($T_{high}$) greater than or equal to 7 Mpa, and more preferably greater than or equal to 9 Mpa after being applied to high surface energy substrate, such as aluminum substrate, under the condition of 23° C. and 50% RH.

The adhesion strength of the two-part adhesive composition of the present invention to low surface energy substrate may be assessed according to ASTM1002.

The two-part adhesive composition of the present invention preferably has an adhesion strength ($T_{low}$) greater than or equal to 7 Mpa, and more preferably greater than or equal to 9 Mpa after being applied to low surface energy substrate, such as PC substrate, under the condition of 23° C. and 50% RH.

The adhesion strength of the two-part adhesive composition of the present invention to low surface energy substrate under rigorous condition may be assess according to ASTM1002.

The two-part adhesive composition of the present invention preferably has an adhesion strength ($T_r$) greater than or equal to 7 Mpa, and more preferably greater than or equal to 9 Mpa after being applied to low surface energy substrate under the condition of 65° C. and 95% RH.

The decrease ratio in adhesion strength of the two-part adhesive composition ($R_d$) under rigorous condition is calculated by the following formula:

$$R_d=(T_{low}-T_r)/T_{low}$$

The two-part adhesive composition of the present invention preferably has a decrease ratio in adhesion strength ($R_d$) less than or equal to 0.3, more preferably less than or equal to 0.15, and even more preferably less than or equal to 0.05 after the two-part adhesive composition is exposed to the condition of 65° C. and 95% RH.

EXAMPLES

The present invention will be further described and illustrated in detail with reference to the following examples. The examples are intended to assist one skilled in the art to better understand and practice the present invention, however, are not intended to restrict the scope of the present invention. All numbers in the examples are based on weight unless otherwise stated.

Test Methods

<Adhesion Strength to High Surface Energy Substrate>

The adhesion strength of the two-part adhesive composition to aluminium substrate was determined according to ASTM1002 under the condition of 23° C. and 50% RH. The aluminium substrate was AnAl (6061) obtained from Dongguan Baiside plastic co., Ltd.

<Adhesion Strength to Low Surface Energy Substrate>

The adhesion strength of the two-part adhesive composition to PC substrate was determined according to ASTM1002 under the condition of 23° C. and 50% RH. The PC substrate was obtained from Dongguan Baiside plastic co., Ltd.

<Adhesion Strength to Low Surface Energy Substrate Under Rigorous Condition>

The adhesion strength of the two-part adhesive composition to PC substrate under rigorous condition was determined according to ASTM1002 under the condition of 65° C. and 95% RH. The PC substrate was obtained from Dongguan Baiside plastic co., Ltd.

<Decrease Ratio of Adhesion Strength>

The decrease ratio of adhesion strength of the two-part adhesive composition ($R_d$) under rigorous conditions is calculated by the following formula:

$$R_d=(T_{low}-T_r)/T_{low}$$

Example 1-11

A first part of the two-part adhesive composition sample was prepared according to Table 1A and 1B. The components in the first part were well mixed at 50° C. and the first part was cooled down to room temperature.

A second part of the two-part adhesive composition sample was prepared according to Table 2A and 2B. MD 1652, Epoxy 828, and DOA/DOTP were firstly mixed together at 100° C. for 5 hours, and the mixture was cooled down to room temperature. BPO and Ultramarine blue colorant (available from Tianlan) was further added to the mixture with stirring to from the second part.

The first part and the second part of the two-part adhesive composition sample were mixed in a weight ratio of 10:1 and were filled into a syringe one minutes before being applied to the substrates. The two-part adhesive composition sample was cured at 23° C., and then subjected to various of tests mentioned above.

TABLE 1A

First part of the two-part adhesive composition

| Components | Example 1 | Example 2 | Example 3 | Example 4 | Example 5 | Example 6 |
|---|---|---|---|---|---|---|
| THFMA[*1] | 40.7 | 37.3 | 34.6 | 36.0 | 29.9 | 30.6 |
| TMCHMA[*2] | 12.8 | 11.8 | 10.9 | 11.3 | 19.9 | 20.2 |
| TEGDMA[*3] | | | | | 2.4 | 2.4 |
| PhemA[*4] | 9.1 | 8.4 | 7.8 | 8.1 | 8.5 | 8.6 |
| IBOMA[*5] | | | | | | |
| DHMA[*6] | 2.6 | 2.4 | 2.2 | 2.3 | | |
| SBS 0243[*7] | 12.8 | 20.5 | 25.5 | 19.7 | 20.7 | 21.0 |
| NBR215[*8] | | | | | | |
| SBS1101[*9] | | | | | | |
| MAA[*10] | 1.1 | | 0.9 | 3.8 | 2.1 | 2.1 |
| MBS-TX100[*11] | 3.6 | 3.4 | 3.1 | 3.2 | 8.8 | 3.4 |
| VTB[*12] | 3.7 | 3.4 | 3.2 | 3.3 | 3.5 | 3.5 |
| TPP[*13] | 0.4 | 0.4 | 0.4 | 0.4 | 0.4 | 0.4 |
| HEPT[*14] | 2.0 | 1.9 | 1.7 | 1.8 | 1.9 | 1.9 |
| cobalt isooctanoate[*15] | | | | | | |
| DMPT[*16] | | | | | | |
| BHT[*17] | 0.1 | 0.1 | 0.1 | 0.1 | 0.1 | 0.1 |
| Polyacrylate 2021[*18] | 8.5 | 7.9 | 7.3 | 7.6 | | 4.0 |
| Polyacrylate 2595[*19] | | | | | | |
| KH570[*20] | 2.1 | 2.0 | 1.8 | 1.9 | 1.3 | 1.3 |
| Wax[*21] | 0.5 | 0.5 | 0.5 | 0.5 | 0.5 | 0.5 |

TABLE 1B

First part of the two-part adhesive composition

| Components | Example 7 | Example 8 | Example 9 | Example 10 | Example 11 |
|---|---|---|---|---|---|
| THFMA[*1] | 32.2 | 29.5 | 37.7 | 37.3 | 37.1 |
| TMCHMA[*2] | | | 11.9 | 11.7 | 11.7 |
| TEGDMA[*3] | | | | | |
| PhemA[*4] | 9.1 | 8.4 | 8.5 | 8.3 | 8.3 |
| IBOMA[*5] | 21.4 | 19.7 | | | |
| DHMA[*6] | 2.6 | 2.4 | 2.4 | 2.3 | 2.3 |
| SBS 0243[*7] | 22.2 | 20.5 | | 20.4 | |
| NBR215[*8] | | | | | 20.3 |
| SBS1101[*9] | | | 20.7 | | |
| MAA[*10] | 2.2 | 2.0 | 1.0 | 1.0 | 1.0 |
| MBS-TX100[*11] | 3.6 | 3.3 | 3.4 | 3.3 | 3.3 |
| VTB[*12] | 3.7 | 3.4 | 3.5 | 3.4 | 3.4 |
| TPP[*13] | 0.4 | 0.4 | 0.4 | 0.4 | 0.4 |
| HEPT[*14] | 2.0 | 1.9 | 1.9 | | 1.8 |
| cobalt isooctanoate[*15] | | | | 0.5 | |
| DMPT[*16] | | | | 1.0 | |
| BHT[*17] | 0.1 | 0.1 | 0.1 | 0.1 | 0.1 |
| Polyacrylate 2021[*18] | | | 8.0 | 7.8 | 7.8 |
| Polyacrylate 2595[*19] | | 7.9 | | | |
| KH570[*20] | | | | 2.0 | 2.0 |
| Wax[*21] | 0.5 | 0.5 | 0.5 | 0.5 | 0.5 |

[1]*THFMA (Tetrahydrofurfuryl methacrylate, from KPX);
[2]*TMCHMA (3,3,5-Trimethylcyclohexyl methacrylate, from KPX);
[3]*TEGDMA (Triethylene glycol dimethacrylate, from Satomer);
[4]*PhemA (phenoxyethyl methacrylate, from KPX);
[5]*IBOMA (Isobornyl methacrylate, from KPX);
[6]*DHMA (Ethylene glycol dimethacrylate, from BASF);
[7]*SBS 0243 (Poly(styrene-butadiene-styrene), from Kraton);
[8]*NBR215 (nitrile-butadiene rubber, from JSR);
[9]*SBS1101 (Poly(styrene-butadiene-styrene), from Kraton);
[10]*MAA (Methacrylic acid, from Sinopharm);
[11]*MBS-TX100 (Poly(methacrylate-butadiene-styrene), from Arkema);
[12]*VTB (vinyl-terminated polybutadiene, from Cray Valley);
[13]*TPP (Triphenyl phosphite, from Sinopharm);
[14]*HEPT (dihydroxyethyl-p-toluidine, from Sinopharm);
[15]*Cobalt isooctanoate (12%) (from Sinopharm);
[16]*DMPT (N,N-dimethyl-p-toluidine, from Sinopharm);
[17]*BHT (Butylated hydroxytoluene, from Sinopharm);
[18]*Elvacite acrylic resin 2021 (Poly(methyl methacrylate), from Lucite International);
[19]*Elvacite acrylic resin 2595 ((Poly(methyl methacrylate), from Lucite International);
[20]*KH570 (3-Methacryloxypropyltrimethoxysilane, from Dowcorning); and
[21]*Wax (58#, from Sinopharm).

TABLE 2A

Second part of the two-part adhesive composition

| | Weight (%) | | | | | |
|---|---|---|---|---|---|---|
| Components | Example 1 | Example 2 | Example 3 | Example 4 | Example 5 | Example 6 |
| BPO*22 | 50 | 39.5 | 39.5 | 39.5 | 44.2 | 44.2 |
| Epoxy 828*23 | | 23 | 23 | 23 | 3.2 | 3.2 |
| DOA*24 | 36.9 | 24.2 | | | | |
| MD 1652*25 | 13 | 13.2 | 13.2 | 13.2 | 10.1 | 10.1 |
| Ultramarine*26 blue | 0.1 | 0.1 | 0.1 | 0.1 | 0.1 | 0.1 |
| DOTP*27 | | | 24.2 | 24.2 | 42.4 | 42.4 |

TABLE 2B

Second part of the two-part adhesive composition

| | Weight (%) | | | | |
|---|---|---|---|---|---|
| Components | Example 7 | Example 8 | Example 9 | Example 10 | Example 11 |
| BPO*22 | 39.5 | 39.5 | 39.5 | 39.5 | 39.5 |
| Epoxy 828*23 | 23 | 23 | 23 | 23 | 23 |
| DOA*24 | | | | | |
| MD 1652*25 | 13.2 | 13.2 | 13.2 | 13.2 | 13.2 |
| Ultramarine blue*26 | 0.1 | 0.1 | 0.1 | 0.1 | 0.1 |
| DOTP*27 | 24.2 | 24.2 | 24.2 | 24.2 | 24.2 |

[22]*BPO (Dibenzoyl peroxide, from Sinopharm);
[23]*Epoxy 828 (Difunctional bisphenol A/epichlorohydrin derived liquid epoxy resin, from Hexion Specialty Chemicals GmbH);
[24]*DOA (Dioctyl adipate, from Wengiang Chemical);
[25]*MD 1652 (Poly(styrene-ethylene-butylene-styrene), from Kraton);
[26]*Ultramarine blue (from Tianlan); and
[27]*DOTP (dioctyl terephthalate, from Sinopharm).

In Table 3, the adhesion strength of the two-part adhesive composition samples to high surface energy substrate ($T_{high}$), and low surface energy substrate ($T_{low}$) is reported. The two-part adhesive composition samples in Examples from 1 to 10 had good adhesion strength to both aluminum substrate and PC substrate. Especially for Examples from 4 to 10, the adhesion strength of the two-part adhesive composition to both aluminum substrate and PC substrate is equal to or higher than 9 Mpa. Whereas for example 11, the first part incorporated NBR which is a polar rubber instead of SBS, the two-part adhesive composition sample showed poor adhesion strength to PC.

In Table 3, the adhesion strength of the two-part adhesive composition sample to low surface energy substrate under rigorous condition ($T_r$) is also reported. The two-part adhesive composition samples in Examples 2, 3, and 6 to 10, had good adhesion strength to PC substrate. In example 1, the amount of SBS in the first part was insufficient leading to a poor adhesion strength of the two-part adhesive composition sample to PC substrate under rigorous condition. In example 4, the first part incorporated too much MAA, so that the adhesion strength of the two-part adhesive composition sample to PC substrate under rigorous condition was deteriorated. In example 5, the polyacrylate polymer was missing from the first part, resulting in a poor adhesion strength of the two-part adhesive composition sample to PC substrate under rigorous condition.

In Table 3, the decrease ratio in adhesion strength of the two-part adhesive composition ($R_d$) under rigorous condition is as well reported. Comparing Example 7 and 8, the incorporation of polyacrylate in the first part was able to reduce $R_d$ significantly. Comparing Example 2,4 and 9, MAA also played an important role to reduce $R_d$. However, if too much MAA was incorporated, the $R_d$ value became bigger.

TABLE 3A

Performance of the two-part adhesive composition

| | Example 1 | Example 2 | Example 3 | Example 4 | Example 5 | Example 6 |
|---|---|---|---|---|---|---|
| $T_{high}$ (Mpa) | 10.3 | 7 | 8.5 | 16 | 14.9 | 15.1 |
| $T_{low}$ (Mpa) | 7 | 11 | 10.5 | 11 | 12.6 | 9.3 |
| $T_r$ (Mpa) | 4.5 | 8 | 9.3 | 3.6 | 4.5 | 7.92 |
| $R_d$ | 0.36 | 0.27 | 0.11 | 0.67 | 0.64 | 0.15 |

TABLE 3B

Performance of the two-part adhesive composition

| | Example 7 | Example 8 | Example 9 | Example 10 | Example 11 |
|---|---|---|---|---|---|
| $T_{high}$ (Mpa) | 17 | 14.5 | 11.5 | 10 | 8 |
| $T_{low}$ (Mpa) | 13.5 | 9 | 10 | 9.8 | 5 |
| $T_r$ (Mpa) | 8.5 | 7 | 9.5 | 9.5 | 3.5 |
| $R_d$ | 0.37 | 0.22 | 0.05 | 0.03 | 0.3 |

What is claimed is:
1. A two-part adhesive composition comprising:
 (a) a first part comprising:
  (i) at least one ethylenically unsaturated monomer;
  (ii) at least one non-polar styrenic block copolymer;
  (iii) at least one curing promoter; and
  (iv) at least one polyacrylate polymer resin; and
 (b) a second part comprising at least one initiator, a hydrogenated styrenic block copolymer, and an epoxy resin.

2. The two-part adhesive composition according to claim 1, wherein the non-polar styrenic block copolymer is selected from a styrene-butadiene (SBS) block copolymer, a styrene-isoprene (STS) block copolymer, a partially hydrogenated product of SBS or SIS with at least one ethylenic unsaturation, or any combination thereof.

3. The two-part adhesive composition according to claim 1, wherein the amount of the non-polar styrenic block copolymer is from 10 to 45% by weight based on the total weight of the first part.

4. The two-part adhesive composition according to claim 1, wherein the initiator is selected from a peroxide initiator, an azo-compound initiator, a redox-system initiator, and any combination thereof.

5. The two-part adhesive composition according to claim 1, wherein the initiator is a peroxide initiator, selected from dicumyl peroxide (DCP), bis(2,4-dichlorobenzoyl)peroxide (DCBP), tert-butyl peroxypivalate (BPP), dicyclohexyl peroxydicarbonate (DCPD), 2,5-dimethyl-2,5-bis(t-butylperoxy)-hexyne (DBPH), t-butylcumyl peroxide, 4,4-di-t-butylperoxy-n-butyl valerate, dibenzoyl peroxide (BPO), potassium persulfate (KSP) and ammonium persulfate (ASP), and any combination thereof.

6. The two-part adhesive composition according to claim 1, wherein the first part further comprises at least one ethylenically unsaturated carboxylic acid, selected from acrylic acid, maleic acid, itaconic acid, crotonic acid, fumaric acid, and any combination thereof.

7. The two-part adhesive composition according to claim 6, wherein the amount of the ethylenically unsaturated carboxylic acid is greater than 0 to 10%, by weight based on the total weight of the first part.

8. The two-part adhesive composition according to claim 6, wherein the amount of the ethylenically unsaturated carboxylic acid is greater than 0 to 2.5%, by weight based on the total weight of the first part.

9. The two-part adhesive composition according to claim 1, wherein the first part contains greater than 0 to 5% of methyl methacrylate (MMA) by weight of the first part.

10. The two-part adhesive composition according to claim 1, wherein the first part further comprises at least one toughener, at least one coupling agent, at least one inhibitor, at least one wax, and any combination thereof.

11. The two-part adhesive composition according to claim 1, wherein the second part further comprises at least one plasticizer, at least one colorant, or any combination thereof.

12. The two-part adhesive composition according to claim 1, comprising
(a) a first part comprising:
  i. from 20 to 90% by weight of the first part of at least one ethylenically unsaturated monomer;
  ii. from 10 to 45% by weight of the first part of at least one non-polar styrenic block copolymer;
  iii. from 0.1 to 10% by weight of the first part of at least one curing promoter;
  iv. up to 10% by weight of the first part of at least one ethylenically unsaturated carboxylic acid;
  v. greater than 0 to 10% by weight of the first part of at least one polyacrylate polymer resin;
  vi. up to 40% by weight of the first part of at least one toughener;
  vii. up to 5% by weight of the first part of at least one inhibitor;
  viii. up to 10% by weight of the first part of at least one coupling agent; and
  ix. up to 5% by weight of the first part of one wax; wherein the weight percentages of all components in the first part add up to 100%;
(b) a second part comprising:
  i. from 5 to 70% by weight of the second part of at least one initiator;
  ii. up to 50% by weight of the second part of at least one epoxy resin;
  iii. up to 40% by weight of the second part of at least one plasticizer;
  iv. up to 40% by weight of the second part of at least one hydrogenated styrenic block copolymer; and
  v. up to 1% by weight of the second part of at least one colorant;
wherein the weight percentages of all components in the second part add up to 100%.

13. A cured product of the two-part adhesive composition according to claim 1.

14. An article bonded by the two-part adhesive composition according to claim 1.

15. The two-part adhesive composition according to claim 1, wherein the first part contains no methyl methacrylate (MMA).

16. The two-part adhesive composition according to claim 1, wherein the ethylenically unsaturated monomer is selected from isobornyl acrylate (IBOA), isobornyl methacrylate (IBOMA), cyclohexyl acrylate, cyclohexyl, methacrylate, t-butyl acrylate, t-butyl methacrylate, t-butylcyclohexyl acrylate, methyl methacrylate, ethyl, methacrylate, propyl methacrylate, phenyl acrylate, phenyl methacrylate, benzyl acrylate, benzyl methacrylate, phenethyl acrylate, phenethyl methacrylate, dicyclopentanyl acrylate, 3,3,5-trimethylcyclohexyl acrylate, 3,3,5-trimethylcyclohexyl methacrylate, dicyclopentenyl acrylate, 1,6-hexanediol diacrylate, 2-ethylhexyl acrylate, n-octyl acrylate, n-nonyl acrylate, n-decyl acrylate, isooctyl, acrylate, n-lauryl acrylate, n-tridecyl acrylate, n-cetyl acrylate, n-stearyl acrylate, isomyristyl acrylate, and isostearyl acrylate.

17. The two-part adhesive composition according to claim 1, wherein the hydrogenated styrenic block copolymer is present in the second part in an amount of 10-30 wt %, based on the total weight of the second part.

18. A two-part adhesive composition consisting of:
(a) a first part including:
  i. at least one ethylenically unsaturated monomer;
  ii. at least one non-polar styrenic block copolymer;
  at least one curing promoter;
  iv. at least one polyacrylate polymer resin;
  V. at least one ethylenically unsaturated carboxylic acid;
  vi. optionally, at least one toughener, at least one coupling agent, at least one inhibitor, at least one wax, and any combination thereof; and
(b) a second part including:
  i. at least one initiator; and
  ii. at least one epoxy resin and at least one hydrogenated styrenic block copolymer, and, optionally, at least one plasticizer, at least one colorant, or a combination thereof.

* * * * *